United States Patent
Bahou

(10) Patent No.: US 9,202,332 B2
(45) Date of Patent: Dec. 1, 2015

(54) ONLINE FANTASY SPORTS GAME SYSTEM AND METHOD

(71) Applicant: HOTBOX SPORTS LLC, Haworth, NJ (US)

(72) Inventor: Tarek Bahou, Haworth, NJ (US)

(73) Assignee: HOTBOX SPORTS LLC, Haworth, NJ (US)

( * ) Notice: Subject to any disclaimer, the term of this patent is extended or adjusted under 35 U.S.C. 154(b) by 0 days.

(21) Appl. No.: 13/741,245

(22) Filed: Jan. 14, 2013

(65) Prior Publication Data

US 2014/0200070 A1 Jul. 17, 2014

(51) Int. Cl.
*G06F 19/00* (2011.01)
*G06F 17/00* (2006.01)
*G07F 17/32* (2006.01)

(52) U.S. Cl.
CPC .......... *G07F 17/3225* (2013.01); *G07F 17/326* (2013.01); *G07F 17/329* (2013.01); *G07F 17/3244* (2013.01); *G07F 17/3262* (2013.01)

(58) Field of Classification Search
CPC ............ G07F 17/3244; G07F 17/3262; G07F 17/329
See application file for complete search history.

(56) References Cited

U.S. PATENT DOCUMENTS

| | | | |
|---|---|---|---|
| 4,918,603 A | 4/1990 | Hughes et al. | 463/4 |
| 5,018,736 A | 5/1991 | Pearson et al. | 463/29 |
| 5,263,723 A | 11/1993 | Pearson et al. | 463/41 |
| 5,332,218 A * | 7/1994 | Lucey | 463/18 |
| 5,346,326 A | 9/1994 | Bienvenu | 402/79 |
| 5,518,239 A * | 5/1996 | Johnston | 273/139 |
| 5,788,283 A | 8/1998 | Adler | 281/38 |
| 5,830,069 A | 11/1998 | Soltesz et al. | 463/42 |
| 5,846,132 A | 12/1998 | Junkin | 463/42 |
| 5,860,862 A | 1/1999 | Junkin | 463/40 |
| 5,971,854 A | 10/1999 | Pearson et al. | 463/41 |
| 6,015,345 A * | 1/2000 | Kail | 463/16 |
| 6,120,376 A * | 9/2000 | Cherry | 463/16 |
| 6,135,881 A | 10/2000 | Abbott et al. | 463/3 |

(Continued)

FOREIGN PATENT DOCUMENTS

WO WO 2006/122105 11/2006

OTHER PUBLICATIONS

Yahoo Fantasy Baseball Rules (Head-2-Head), at http://help.yahoo.com/1/us/yahoo.baseball/rules/index.html.

(Continued)

*Primary Examiner* — Lawrence Galka
(74) *Attorney, Agent, or Firm* — Winston & Strawn LLP

(57) ABSTRACT

A method of enabling a user to play an online fantasy sports game that provides an opportunity to play the game when the user visits a lottery site, provides a plurality of fantasy sports selections in a time window, the plurality of fantasy sports selections corresponds to an option to select a plurality of related actual sports games specified in the time window for that fantasy sport selection, receives the one or more fantasy sports selections that completes a lottery submission before the time window begins, determines a fantasy performance score for each of the plurality of corresponding actual sports games, determines which users have won the game based on each user's selections and each of the determined corresponding fantasy performance scores, and transmits an electronic message indicating one or more winners of corresponding lottery submissions when certain users are identified to have won the game.

18 Claims, 7 Drawing Sheets

(56) References Cited

U.S. PATENT DOCUMENTS

| | | | |
|---|---|---|---|
| 6,170,829 B1 | 1/2001 | Harvey | 273/298 |
| 6,193,610 B1 | 2/2001 | Junkin | 463/40 |
| 6,371,855 B1 | 4/2002 | Gavriloff | 463/42 |
| 6,415,188 B1 | 7/2002 | Fernandez et al. | 700/67 |
| 6,434,398 B1 | 8/2002 | Inselberg | 455/517 |
| 6,471,207 B1 | 10/2002 | Schlaifer | 273/138.1 |
| 6,650,903 B2 | 11/2003 | Inselberg | 455/517 |
| 6,656,042 B2 | 12/2003 | Reiss et al. | 463/17 |
| 6,669,565 B2 | 12/2003 | Liegey | 463/42 |
| 6,688,973 B2 | 2/2004 | Satloff et al. | 463/1 |
| 6,688,978 B1* | 2/2004 | Herman | 463/25 |
| 6,760,595 B2 | 7/2004 | Inselberg | 455/517 |
| 6,832,178 B1 | 12/2004 | Fernandez et al. | 702/189 |
| 6,910,965 B2* | 6/2005 | Downes | 463/28 |
| 6,922,664 B1 | 7/2005 | Fernandez et al. | 703/13 |
| 6,961,537 B2 | 11/2005 | Rajaram | 455/3.01 |
| 6,975,878 B2 | 12/2005 | Inselberg | 445/517 |
| 6,996,413 B2 | 2/2006 | Inselberg | 455/517 |
| 7,001,279 B1 | 2/2006 | Barber et al. | 463/42 |
| 7,051,022 B1 | 5/2006 | Faisal | 707/5 |
| 7,485,037 B2* | 2/2009 | Penrice | 463/17 |
| 7,699,707 B2 | 4/2010 | Bahou | 463/42 |
| 2001/0034635 A1 | 10/2001 | Winters | 705/10 |
| 2001/0034643 A1* | 10/2001 | Acres | 705/14 |
| 2001/0039210 A1 | 11/2001 | St.-Denis | 463/42 |
| 2001/0044336 A1 | 11/2001 | Reiss et al. | 463/17 |
| 2002/0029381 A1 | 3/2002 | Inselberg | 725/9 |
| 2002/0034980 A1 | 3/2002 | Lemmons et al. | 463/40 |
| 2002/0049783 A1 | 4/2002 | Berk et al. | 715/500.1 |
| 2002/0059094 A1 | 5/2002 | Hosea et al. | 705/10 |
| 2002/0065097 A1 | 5/2002 | Brockenbrough et al. | 455/552.1 |
| 2002/0069161 A1 | 6/2002 | Eckert et al. | 705/38 |
| 2002/0077952 A1 | 6/2002 | Eckert et al. | 705/36 R |
| 2002/0077961 A1 | 6/2002 | Eckert et al. | 705/37 |
| 2002/0107073 A1 | 8/2002 | Binney | 463/42 |
| 2002/0107590 A1 | 8/2002 | Liegey | 700/91 |
| 2002/0115488 A1 | 8/2002 | Berry et al. | 463/42 |
| 2002/0116297 A1 | 8/2002 | Olefson | 705/27 |
| 2002/0157099 A1 | 10/2002 | Schrader et al. | 725/51 |
| 2002/0157101 A1 | 10/2002 | Schrader et al. | 725/64 |
| 2002/0166123 A1 | 11/2002 | Schrader et al. | 725/58 |
| 2003/0004887 A1 | 1/2003 | Roszak | 705/57 |
| 2003/0014277 A1 | 1/2003 | Kinney | 705/1 |
| 2003/0018571 A1 | 1/2003 | Eckert et al. | 705/37 |
| 2003/0054885 A1 | 3/2003 | Pinto et al. | 463/42 |
| 2003/0055713 A1 | 3/2003 | Pinto et al. | 705/10 |
| 2003/0107173 A1 | 6/2003 | Satloff et al. | 273/292 |
| 2003/0110480 A1 | 6/2003 | Rajaram | 717/140 |
| 2003/0144017 A1 | 7/2003 | Inselberg | 455/517 |
| 2003/0189589 A1 | 10/2003 | LeBlanc et al. | 715/723 |
| 2003/0203757 A1 | 10/2003 | Chanda et al. | 463/42 |
| 2004/0029627 A1* | 2/2004 | Hannan et al. | 463/1 |
| 2004/0047287 A1 | 3/2004 | Tremblay et al. | 370/229 |
| 2004/0048656 A1* | 3/2004 | Krynicky | 463/25 |
| 2004/0058697 A1 | 3/2004 | Inselberg | 455/517 |
| 2004/0073437 A1 | 4/2004 | Halgas et al. | 705/1 |
| 2004/0110552 A1 | 6/2004 | Del Prado | 463/4 |
| 2004/0117831 A1 | 6/2004 | Ellis et al. | 725/53 |
| 2004/0171381 A1 | 9/2004 | Inselberg | 455/426.2 |
| 2004/0259577 A1 | 12/2004 | Ackley | 455/466 |
| 2004/0266530 A1 | 12/2004 | Bishop | 463/42 |
| 2004/0266535 A1 | 12/2004 | Reeves | 463/42 |
| 2005/0001837 A1 | 1/2005 | Shannon | 345/440 |
| 2005/0022686 A1 | 2/2005 | Wessells et al. | 101/368 |
| 2005/0049731 A1 | 3/2005 | Dell | 700/91 |
| 2005/0049933 A1 | 3/2005 | Upendran et al. | 705/26 |
| 2005/0049957 A1 | 3/2005 | Valiki et al. | 705/37 |
| 2005/0050022 A1 | 3/2005 | Dukes et al. | 707/3 |
| 2005/0050160 A1 | 3/2005 | Upendran et al. | 709/217 |
| 2005/0050576 A1 | 3/2005 | Upendran et al. | 725/110 |
| 2005/0064937 A1 | 3/2005 | Ballman | 463/40 |
| 2005/0075983 A1 | 4/2005 | St.-Denis | 705/64 |
| 2005/0076362 A1 | 4/2005 | Dukes et al. | 725/46 |
| 2005/0076363 A1 | 4/2005 | Dukes et al. | 725/46 |
| 2005/0076364 A1 | 4/2005 | Dukes et al. | 725/46 |
| 2005/0076383 A1 | 4/2005 | Upendran et al. | 725/109 |
| 2005/0076384 A1 | 4/2005 | Upendran et al. | 725/109 |
| 2005/0116422 A1 | 6/2005 | Fish | 273/459 |
| 2005/0137728 A1 | 6/2005 | Guagliardo | 700/91 |
| 2005/0159220 A1 | 7/2005 | Wilson et al. | 463/40 |
| 2005/0164792 A1 | 7/2005 | Wilcock | 463/42 |
| 2005/0172323 A1 | 8/2005 | Yang et al. | 725/109 |
| 2005/0228780 A1 | 10/2005 | Diab et al. | 707/3 |
| 2005/0239549 A1 | 10/2005 | Salvatore et al. | 463/42 |
| 2006/0010251 A1 | 1/2006 | Mrsic-Flogel et al. | 709/245 |
| 2006/0025208 A1 | 2/2006 | Ramsey | 463/25 |
| 2006/0031106 A1 | 2/2006 | Browde | 705/7 |
| 2006/0040719 A1 | 2/2006 | Plimi | 463/9 |
| 2006/0041550 A1 | 2/2006 | Bennett et al. | 707/5 |
| 2006/0041562 A1 | 2/2006 | Paczkowski et al. | 707/7 |
| 2006/0046807 A1 | 3/2006 | Sanchez | 463/9 |
| 2006/0063519 A1 | 3/2006 | Rajaram | 455/419 |
| 2006/0068824 A1 | 3/2006 | Inselberg | 455/517 |
| 2006/0079312 A1 | 4/2006 | Penrice | 463/17 |
| 2006/0085259 A1 | 4/2006 | Nicholas et al. | 705/14 |
| 2006/0089935 A1 | 4/2006 | Clifford et al. | 707/10 |
| 2006/0094409 A1 | 5/2006 | Inselberg | 455/414.1 |
| 2006/0095148 A1 | 5/2006 | Bowman et al. | 700/90 |
| 2006/0095331 A1 | 5/2006 | O'Malley et al. | 705/22 |
| 2006/0095344 A1 | 5/2006 | Nakfoor | 705/26 |
| 2006/0100006 A1 | 5/2006 | Mitchell et al. | 463/9 |
| 2006/0217198 A1 | 9/2006 | Johnson | 468/40 |
| 2006/0252476 A1* | 11/2006 | Bahou | 463/4 |
| 2007/0004516 A1* | 1/2007 | Jordan et al. | 463/42 |
| 2009/0026706 A1 | 1/2009 | St. Clair et al. | |
| 2010/0160035 A1 | 6/2010 | Herrmann | |
| 2012/0115585 A1* | 5/2012 | Goldman et al. | 463/25 |
| 2012/0276990 A1* | 11/2012 | Arezina et al. | 463/29 |
| 2013/0079094 A1* | 3/2013 | Odom et al. | 463/17 |

OTHER PUBLICATIONS

NHL—Fantasy Format, at http://benchboss.nhl.com/boss_s/display1.asp?gameid=31&page=rules.
NASCAR—Yahoo, at http://help.yahoo.com/l/us/yahoo/racing/rules/rules/rrules-01.html.
Fantasy Golf—Yahoo, at http://help.yahoo.com/l/us/yahoo/golf/rules/grules-01.html.
Premier League Format—ESPN, from ESPN, undated.
Fantasy Football (American), from Wikipedia, the free encyclopedia, Sep. 2006.
Examiner's Affidavit, from PCT International Search Report in International Application No. PCT/US06/17886, filed on May 9, 2006.
International Search Report and Written Opinion, Appl. No. PCT/US2014/11324, Feb. 23, 2015.

\* cited by examiner

MONDAYS LINEUP

FORWARDS — WEEK 1

| # | NAME | | MULTIPLIER | MON | WED | FRI |
|---|------|---|---|---|---|---|
| 23 | DAVID CLARKSON | STARTER ▼ | ○ | ⊙ @CHI | ○ @CHI | ○ BOS |
| 10 | ROD PELLEY | STARTER ▼ | ○ | ⊙ @CHI | ○ @CHI | ○ BOS |
| 14 | TIM SESTITO | STARTER ▼ | ○ | ⊙ @CHI | ○ @CHI | ○ BOS |
| 16 | JACOB JOSEFSON | STARTER ▼ | ⊛ | ⊙ @CHI | ○ @CHI | ○ BOS |
| 9 | ZACH PARISE | STARTER ▼ | ○ | ⊙ @CHI | ○ @CHI | ○ BOS |
| 32 | NICK PALMIERI | STARTER ▼ | ○ | ⊙ @CHI | ○ @CHI | ○ BOS |

DEFENSEMEN

| # | NAME | | | | | |
|---|------|---|---|---|---|---|
| 33 | JAY LEACH | STARTER ▼ | ○ | ⊙ @CHI | ○ @CHI | ○ BOS |
| 2 | MARK FRASER | STARTER ▼ | ○ | ⊙ @CHI | ○ @CHI | ○ BOS |
| 34 | MARK FAYNE | STARTER ▼ | ○ | ⊙ @CHI | ○ @CHI | ○ BOS |
| 6 | ANDY GREENE | STARTER ▼ | ○ | ⊙ @CHI | ○ @CHI | ○ BOS |

GOALIES

FIG. 6

ONLINE FANTASY SPORTS GAME SYSTEM AND METHOD

FIELD OF THE INVENTION

The present invention relates to fantasy sports, and the software used in a preferred embodiment, having a game submission feature that allows a user to select one or more real-life games of each player occurring during a particular time period that makes up only a portion of the season, and in particular to a fantasy game or fantasy series that spans a particular time period, and for which real-life statistics generated by each player during the selected real-life games are used to determine if the user is a winner based on the user's selection in the particular time period.

BACKGROUND OF THE INVENTION

Fantasy sports is a game where participants act as owners to build a team that competes against other fantasy owners based on the statistics generated by the real individual players or teams of a sport. Usually statistical performances are converted into points that are compiled and totaled according to a roster selected by a manager (or owner) that makes up a fantasy team. More complex variants use computer modeling of actual games based on statistical input generated by professional sports. In fantasy sports there is sometimes the ability to trade, cut, and sign players, like a real sports owner. A typical fantasy sport league can require a large time commitment for at least an entire season and can also require a large amount of work to do research about teams and players. Improvements to the game and its application to new areas can increase the interest and its excitement in the game.

SUMMARY OF THE INVENTION

A method is directed towards enabling a user to play an online fantasy sports game. The method comprises providing, to the user, an opportunity to play the online fantasy sports game when the user lands on a lottery site. The method also comprises in response to a user selection to play a fantasy sports game on the lottery site, directing the user to the online fantasy sports game. The method further comprises in response to the selection, providing, to the user, a plurality of fantasy sports selection options for playing the game, the plurality of fantasy sports selections options corresponds to the option to select from a plurality of related actual sports games specified in a time window, where the time window is less than a full season. The method comprises receiving from the user, a set of fantasy sports selections that completes a lottery submission before the time window begins. The method also comprises determining, on a computer system and from a data feed of game activity, a fantasy performance score for each of the plurality of corresponding actual sports games using a fantasy scoring formulation. The method further comprises determining, on a computer system, which users have won the online fantasy sports game based on each user's selections and each of the determined corresponding fantasy performance scores. The method comprises transmitting electronic message indicating one more winners of corresponding lottery submissions when certain users are identified by the computer system to have won the fantasy sports game.

In one embodiment, the method may also comprise wherein the fantasy sports selections relate to a real life player. In another embodiment, the method may further comprise wherein the one or more related actual sports games are either professional sports teams or college sports teams. In yet another embodiment, the method further comprises determining a player fantasy performance score for a real life player. In another embodiment, the method may also comprise wherein the user submits at least five fantasy sports selections. In another embodiment, the method may further comprise determining the player's best game based on the player fantasy performance score in the time window, comparing the user's at least five selections and the player's best game, and determining that the user's at least five selections and each player's best game are the same.

In another embodiment, the method may further comprise that the user is a winner of the online fantasy sports game when each of the user's five selections are the same as each of the player's best game. In yet another embodiment, the method may also comprise providing a multiplier selection that when selected and the user is a winner, awarding the user with a more valuable award. In another embodiment, the method may comprises wherein the online fantasy sports game is a mobile application. In yet another embodiment, the method may comprise wherein the lottery site is a mobile application.

A method is directed towards enabling a user to play an online fantasy sports game. The method comprises displaying in a game submission window a set of real life players and a plurality of corresponding real life games in a time window, wherein the time window is less than a full season and the time window includes at least two or more real life games. The method also comprises enabling a user to make a selection of a fantasy lineup, the fantasy lineup including a subset of the set of real life players, wherein in the subset includes at least two or more real life players. The method further comprises enabling the user to make a game selection of one of the plurality of corresponding real life games for each of the real life players in the fantasy lineup, wherein the user is allowed to make a single game selection for each real life player. The method comprises receiving, by a computer system, the game selections from the user for the fantasy lineup and recording the selections in a database associated with the computer system. The method further comprises submitting each game selection as a game submission for the user for the time window. The method comprises preventing the user from revising any game selections after the time window has started. The method also comprises generating on the computer system using data feeds of game activity a fantasy performance score for each real life player corresponding to the plurality of corresponding real life games in the time window using a fantasy scoring formulation. The method further comprises determining on the computer system for each real life player a best game in the time window by identifying the real life game in which that player had his highest fantasy performance score. The method comprises determining, on the computer system, that the user selected each player's best game correctly in the time window. The method further comprises determining, on the computer system, an award amount for each game submission and time window. The method also comprises transmitting an electronic message awarding the user the award amount upon determining that the selected each real life player correctly in the game submission.

In one embodiment, the method comprises wherein the plurality of corresponding real life games are professional sports teams or college sports teams. In another embodiment, the method also comprises wherein the fantasy lineup includes at least five real life players and game submission includes at least five game selections corresponding to the at least five real life players. In another embodiment, the method further comprises determining that the user's at least five selections and the game corresponding to the player's best game are the same. In yet another embodiment, the method comprises providing a multiplier selection that when selected and the user is a winner, increasing the award amount. In another embodiment, the method further comprises wherein the online fantasy sports game is a mobile application.

A computer-readable storage medium can comprise instructions executed by a processor or electronic device to perform at least some of the steps of at least some of the methods described above.

BRIEF DESCRIPTION OF DRAWINGS

Further advantageous features of the present invention will become more apparent with the following detailed description when taken with reference to the accompanying drawings in which:

FIG. 6 illustrates another exemplary screenshot, in accordance with one embodiment of the present invention.

DETAILED DESCRIPTION OF THE PREFERRED EMBODIMENTS

In accordance with some principles of the present invention, an online fantasy sports game system and method of playing that allows a user to make selections, such as professional teams, players, specific games, etc., and potentially win an award if the selections made are correct can be provided.

Figure 1:
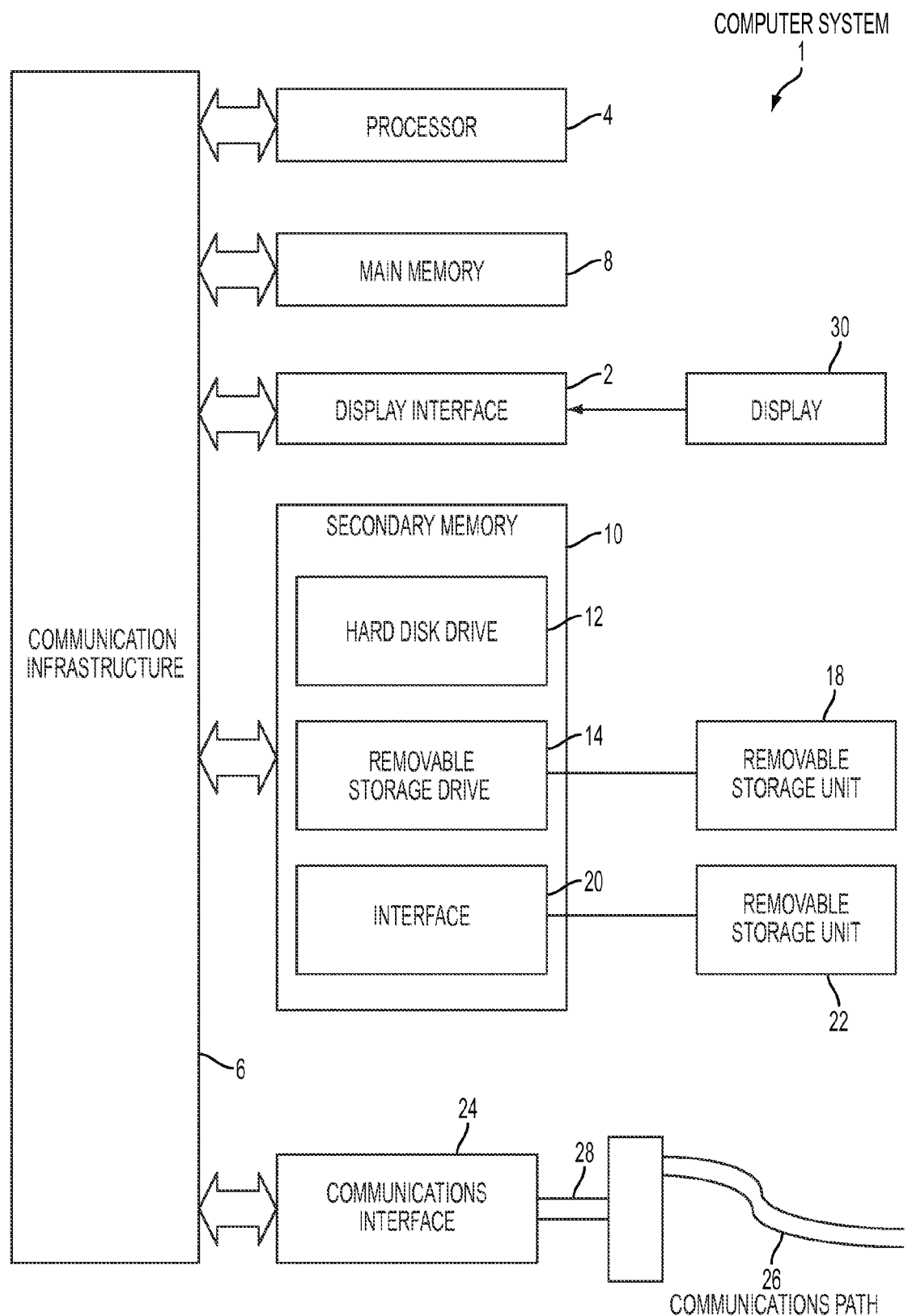
FIG. 1 illustrates a block diagram with various computer system components for use with an exemplary implementation of a fantasy sports league system, in accordance with one embodiment of the present invention.

As shown in FIG. 1, the present invention may be implemented using hardware, software, or a combination thereof, and may be implemented in one or more computer systems or other processing systems. In one embodiment, the invention is directed toward one or more computer systems capable of carrying out the functionality described herein.

FIG. 1 shows a computer system 1 that includes one or more processors, such as processor 4. The processor 4 is connected to a communication infrastructure 6 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1 can include a display interface 2 that forwards graphics, text, and other data from the communication infrastructure 6 (or from a frame buffer not shown) for display on the display unit 30. Computer system 1 also includes a main memory 8, preferably random access memory (RAM), and may also include a secondary memory 10. The secondary memory 10 may include, for example, a hard disk drive 12 and/or a removable storage drive 14, representing a floppy disk drive, a magnetic tape drive, an optical disk drive, etc. The removable storage drive 14 reads from and/or writes to a removable storage unit 18 in a well known manner. Removable storage unit 18, represents a floppy disk, magnetic tape, optical disk, etc., which is read by and written to removable storage drive 14. As will be appreciated, the removable storage unit 18 includes a computer usable storage medium having stored therein computer software and/or data.

In alternative embodiments, secondary memory 10 may include other similar devices for allowing computer programs or other instructions to be loaded into computer system 1. Such devices may include, for example, a removable storage unit 22 and an interface 20. Examples of such may include a program cartridge and cartridge interface (such as that found in video game devices), a removable memory chip (such as an erasable programmable read only memory (EPROM), or programmable read only memory (PROM)) and associated socket, and other removable storage units 22 and interfaces 20, which allow software and data to be transferred from the removable storage unit 22 to computer system 1.

Computer system 1 may also include a communications interface 24. Communications interface 24 allows software and data to be transferred between computer system 1 and external devices. Examples of communications interface 24 may include a modem, a network interface (such as an Ethernet card), a communications port, a Personal Computer Memory Card International Association (PCMCIA) slot and card, etc. Software and data transferred via communications interface 24 are in the form of signals 28, which may be electronic, electromagnetic, optical or other signals capable of being received by communications interface 24. These signals 28 are provided to communications interface 24 via a communications path (e.g., channel) 26. This path 26 carries signals 28 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 14, a hard disk installed in hard disk drive 12, and signals 28. These computer program products provide software to the computer system 1.

Computer programs (also referred to as computer control logic) are stored in main memory 8 and/or secondary memory 10. Computer programs may also be received via communications interface 24. Such computer programs, when executed, enable the computer system 1 to perform the features of the present invention, as discussed herein. In particular, the computer programs, when executed, enable the processor 4 to perform the features of the present invention. Accordingly, such computer programs represent controllers of the computer system 1.

In an embodiment where the invention is implemented using software, the software may be stored in a computer program product and loaded into computer system 1 using removable storage drive 14, hard drive 12, or communications interface 24. The control logic (software), when executed by the processor 4, causes the processor 4 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s). In yet another embodiment, the invention is implemented using a combination of both hardware and software.

Figure 2:
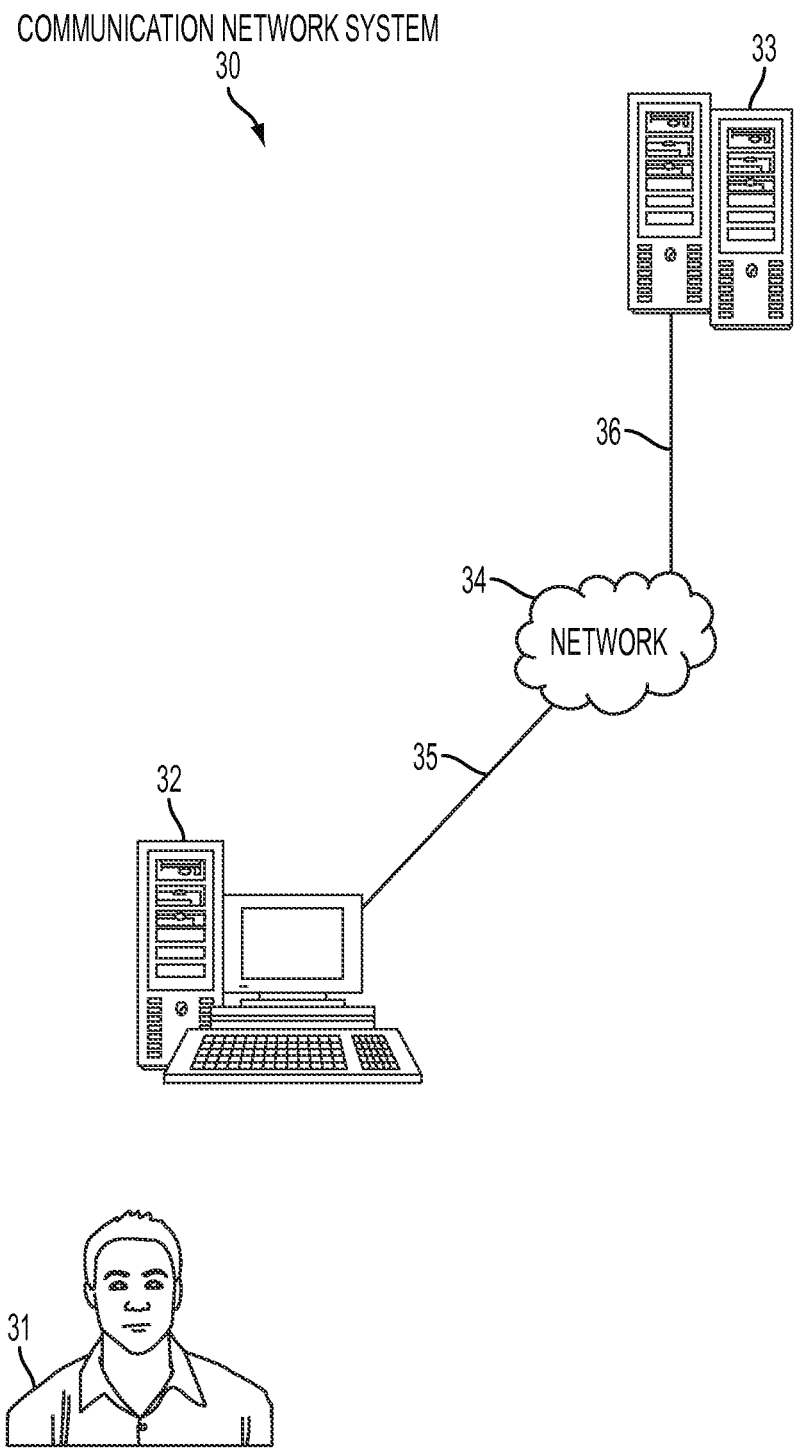
FIG. 2 illustrates a communication system of the present invention for use with the computer system of FIG. 1, in accordance with one embodiment of the present invention.

Now referring to FIG. 2, which is a communication system for use with the computer system of FIG. 1, in accordance with one embodiment of the present invention. The communication system 30 includes an accessor 31 (also referred to interchangeably herein as a "user") and a terminal 32. In one embodiment, data for use in the computer system 1 is, for example, input and/or accessed by the accessor 31 via the terminal 32, such as a personal computer (PC), minicomputer, mainframe computer, microcomputer, telephonic device, or wireless device, such as a hand-held wireless device coupled to a server 33, such as a PC, minicomputer, mainframe computer, microcomputer, or other device having a processor and a repository for data and/or connection to a processor and/or repository for data, via, for example, a network 34, such as the Internet or an intranet, and couplings 35, 36. The couplings 35, 36 include, for example, wired, wireless, or fiberoptic links. In another embodiment, the method and system of the present invention operate in a stand-alone environment, such as on a single terminal. For all data received or transmitted under the present invention, such as player statistics and team scores, may be calculated based on values input, which may be manually input or downloaded from a database at any location, preferably remote. The database itself can be online, stored in fixed memory, or disk-based.

Figure 3:
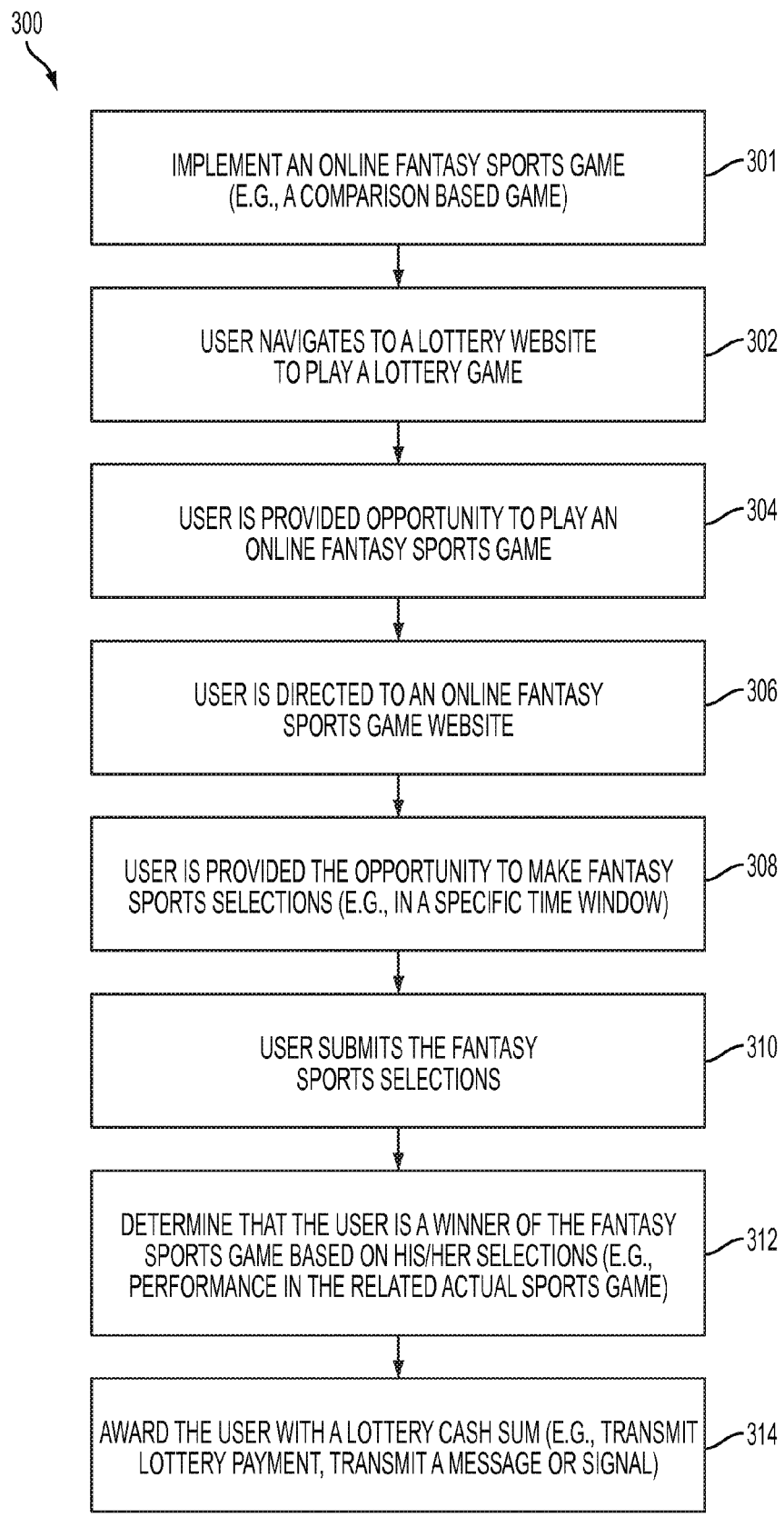
FIG. 3 illustrates a method and steps of one embodiment, in accordance with one embodiment of the present invention.

Now referring to FIG. 3, which is an exemplary method 300 and steps of one embodiment of the present invention. At step 301, implement an online fantasy sports game (e.g., a comparison based game) in connection with real life sports games in which each fantasy player has to select for each member of his or her fantasy team or lineup the real life game in which that member will have a performance fantasy sports achievement relative to that member's other real life games in a time window (e.g., less than a season comprising a set of near term games). A game submission or time window may be a specific time period that is less than a full sports season. Also, the game submission or time window may include consecutively played game of a player or non-consecutively played games.

At step 302, a user navigates to a lottery site to play a lottery game. Examples of a lottery site includes, but is not limited to, nylottery.org, Powerball, mega million, pick 5, etc. It should also be appreciated that the lottery site could be a lottery mobile application downloaded to a mobile device. At step 304, the user is provided the opportunity to play an online fantasy sports game. The lottery site may include a link or some other method to navigate to an online fantasy sports game. In one embodiment, the lottery mobile application or site may enable a user to play the online fantasy sports game through the application/site. The lottery mobile application/site may also direct the user to download a different mobile application that is directed towards the online fantasy sports game. The lottery mobile application or site may also enable the fantasy player or user to go back and check on the performance of his or her fantasy team or lineup during the time window. The online fantasy sports game may provide this functionality, as well.

At step 306, the user is directed to an online fantasy sports game. The online fantasy sports game may be presented to the user in many different ways including, but not limited to, a website and a mobile application. In one embodiment, the lottery site may present the online fantasy sports game within a frame directly on the lottery site. The online fantasy sports game may include many different options of sports games for the user to play. For example, the user may be presented with a selection for designating a particular sport to play, such as football, basketball, baseball, soccer, hockey, etc. The sports may also be designated between professional leagues (e.g., NBA, NFL, NHL, MLS, etc.) or college leagues. Further, the user may be able to select different teams within each league, such as Kansas City Chiefs, Missouri Tigers, New York Yankees, Detroit Redwings, etc. Then the user may be presented with different players associated with the selected teams. Also, the user may be presented with information about each player and team.

At step 308, the user is provided the opportunity to make fantasy sports selections (e.g., in a specific time window). For example, if the user selects NBA and then selects the New York Knicks, the user may be presented with all of the players currently on the New York Knicks. The specific time window is a designated set of time that the game(s) will be played. For example, the specific time window may be the next 3, 5, or N games scheduled for the team or player selected. In the case of football, the specific time window may be different because usually only one game is played in one week. The time window may also be less than a full season in whatever sport is chosen. If desired, each fantasy sports game can be for a short period of near term upcoming real life games in a sports league.

Also, the user may be able to select a fantasy lineup including at least two or more real life players. Therefore, at step 308 the user may make selections about a particular team or player within the specific time window. In the example that the user selected the New York Knicks, the user may want to select one or more players on the Knicks that will have their best game on X night in the upcoming specific time window out of the other Y games played in that time window. Also, a user may want to choose to select which game a particular player will have his/her best game in the specific time window. Also the fantasy sports game may give the option of only a limited number of players to select from and the lottery/fantasy players have to select a subset of the players to start. This feature may make the fantasy sports game more challenging.

While one embodiment is directed towards a fantasy player competing against himself, another embodiment allows multiple fantasy players to play the game and compete against each other and themselves. In the embodiment where other fantasy players are playing, the other fantasy players may have the opportunity to select the same real life players to start in their fantasy game submissions. It should be appreciated both embodiments may be implemented at the same time.

At step 310, the user submits the fantasy sports selections. Once the user has selected all the options for the time window and submits the selections with the online fantasy sports game, the user may not be able to revise or change the selections. Also, the online fantasy sports game may prevent a user from making selections or changes to the selections after the specific time window has started. For example, if the specific time window is a Wednesday through Tuesday of the next week, the user will be prevented from revising the selections made after Tuesday of the current week.

At step 312, it is determined whether the user is a winner of the fantasy sports game based on his/her selections (e.g., performance in the related actual sports games). Once the time window has lapsed, the online fantasy sports game would determine a fantasy performance score for each actual game played during the time window and a fantasy performance score for each player during the time window. For example, if the Knicks played in the upcoming time window on night 1, night 2, and night 3 and the user selected that the Knicks would have their best night on night 2, then the online fantasy sports game system would determine a fantasy score for all three nights for the Knicks and determine which night in that time window was the best night. The determination of the best night may be calculated using a fantasy scoring formulation. Then, it would be determined if the user was a winner based on the selection(s) made by the user. In the situation where a user selects more than one selection, the online fantasy sports game may determine that each selection needs to be correct in order for the user to be considered a winner.

At step 314, the user is awarded with a lottery cash sum if it has been determined that the user is a winner based on his/her selection(s). It should be appreciated that the lottery cash sum may be many different types of awards, such as money, free future game plays, or other awards. In some embodiments, winning is based on or determined by comparing an individual real life player's performance against his or her performance in the other games in the time window, and doing that for each player selected by the fantasy player for his or her fantasy team or lineup, and determining how many of the real life players the right game was selected in a game submission. If all of the games or some predetermined subset of games is selected correctly, the fantasy player wins. Also, it may be determined for each player which game was his or her best and/or worst performance in each of the other games in that time window.

Figure 4:
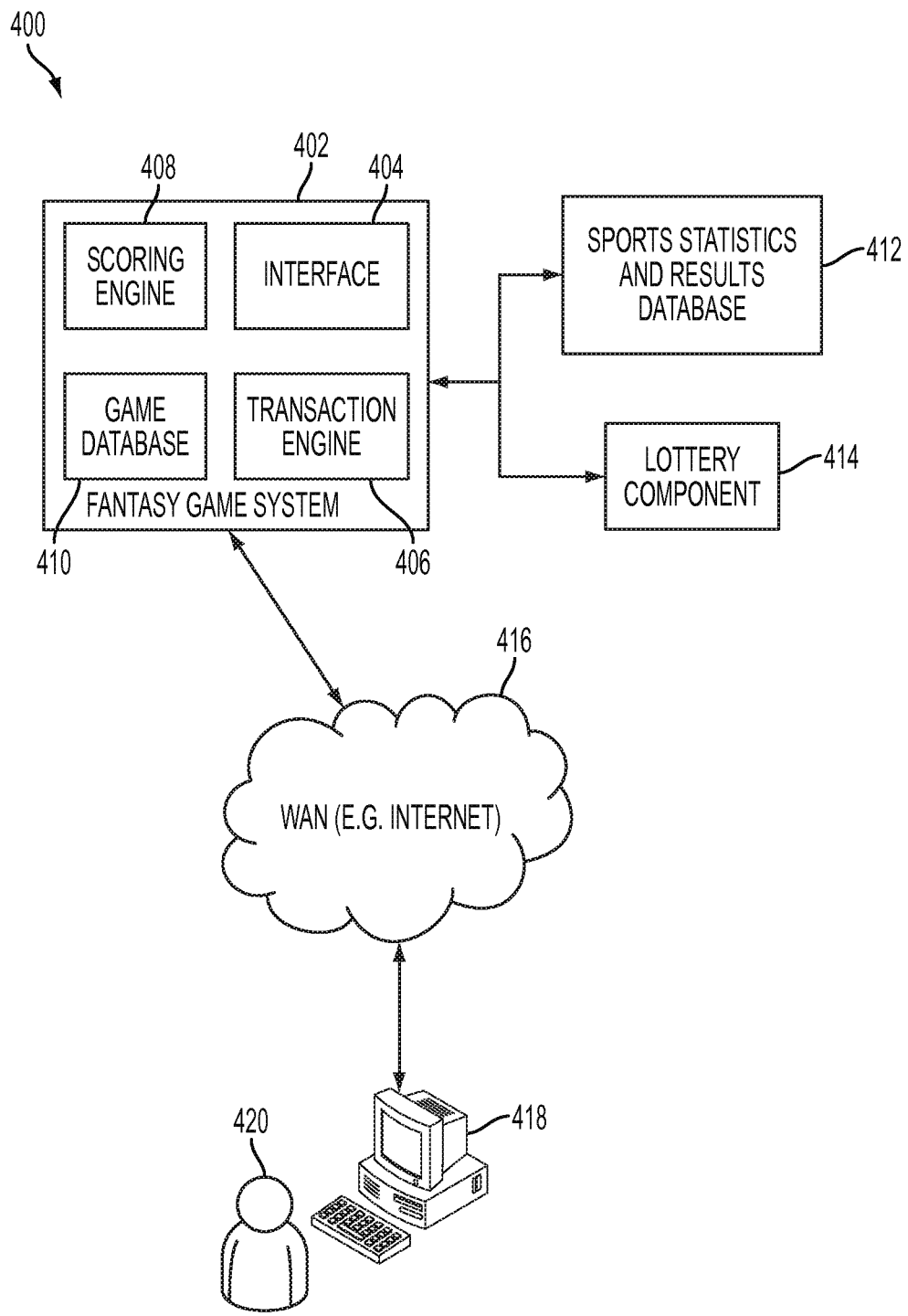
FIG. 4 illustrates an exemplary system diagram, in accordance with one embodiment of the present invention.

Now referring to FIG. 4, which is an exemplary system diagram for the system 400, in accordance with the embodiments of the present invention. The system 400 may include an online fantasy sports game system 402, a sports statistics and results database 412, a lottery component 414, wide area network (WAN) 416, a user's computer 418, and a user 420. The online fantasy sports game system 402 may also include an interface 404, a transaction engine 406, a scoring engine 408, and a game database 410. The online fantasy sports game system 402 is not limited to only these components. The interface 404 may provide functionality that enables the system 402 to interact with the other components either within the fantasy sports game system 402 or outside of the fantasy sports game system 402. The interface 404 may also provide a user interface that the user would view when visiting the fantasy sports game website or mobile application.

The transaction engine 406 may provide many different functionalities, such as facilitating financial transactions between the fantasy sports game system 402 and the user 420. For example, the user 420 may purchase a subscription or pay per use fee to make selections on the fantasy sports game website or mobile application. The transaction engine 406 may provide functionality to receive credit card information and/or other methods of payment (e.g. paypal, wire transfer, etc.). Also, if the user is determined to be a winner after making and submitting selections on the fantasy sports game website or mobile application, the transaction engine 406 may provide functionality to provide the award to the user 420. For example, if the award is a cash prize, the transaction engine 406 may facilitate obtaining the user's 420 mailing address, or information for a direct deposit into a bank account, etc. If the award is not cash prize, the transaction engine 406 may also help facilitate awarding the user 420 with the award in other ways.

The scoring engine 408 may provide functionality for determining a fantasy performance score for each game or player within a specific time window. The scoring engine 408 may be in communication with the sports statistics and results database 412 and the game database 410. The game database 410 may be used to store information pertaining to past, present and future games within the fantasy sports game system 402. The game database 410 may include user 420 information. The user 420 information may include, but is not limited to, past and present game submissions and results, financial information, personal preferences, etc. The sports statistics and results database 412 may include information pertaining to the actual real life sports games. The sports statistics and results database 412 may also receive and transmit data feed information pertaining to the relevant sports information. The scoring engine 408 may utilize information requested or received from the sports statistics and results database 412 to determine if a user is a winner, to create odds of a particular player, game, or team selection.

Determining the odds of a particular player, game, or team may influence the amount of the award that is awarded to user 420 in the situation that user 420 is a winner. The scoring engine 408 may also be in communication with the lottery component 414 to make these determinations about the odds. The scoring engine 408 may request information from the game database 410 to make the determination of whether the selection(s) of user 420 was correct. Once the scoring engine 408 makes the determination about whether user 420 is a winner within the time window, the scoring engine 408 may communicate this information to the interface 404 or the transaction engine 406, or both.

The sports statistics and results database 412 may request or receive up to date information about relevant real life sports games. The lottery component 414 may provide functionality to facilitate communication between the fantasy sports game system 402 and a third-party lottery site or mobile application. The computer 418 and the fantasy sports game system 402 may be communicatively coupled to a WAN 416. For example, the WAN 416 could be the Internet. The WAN may include wired, wireless networks and interconnection. If desired, the WAN may be a private network. The sports statistics and results database 412 and the lottery component 414 may also be communicatively coupled to the WAN 416. The computer 418 may be any different types of computing devices, such as a personal computer, laptop, mobile device, tablet, etc.

Figure 5:
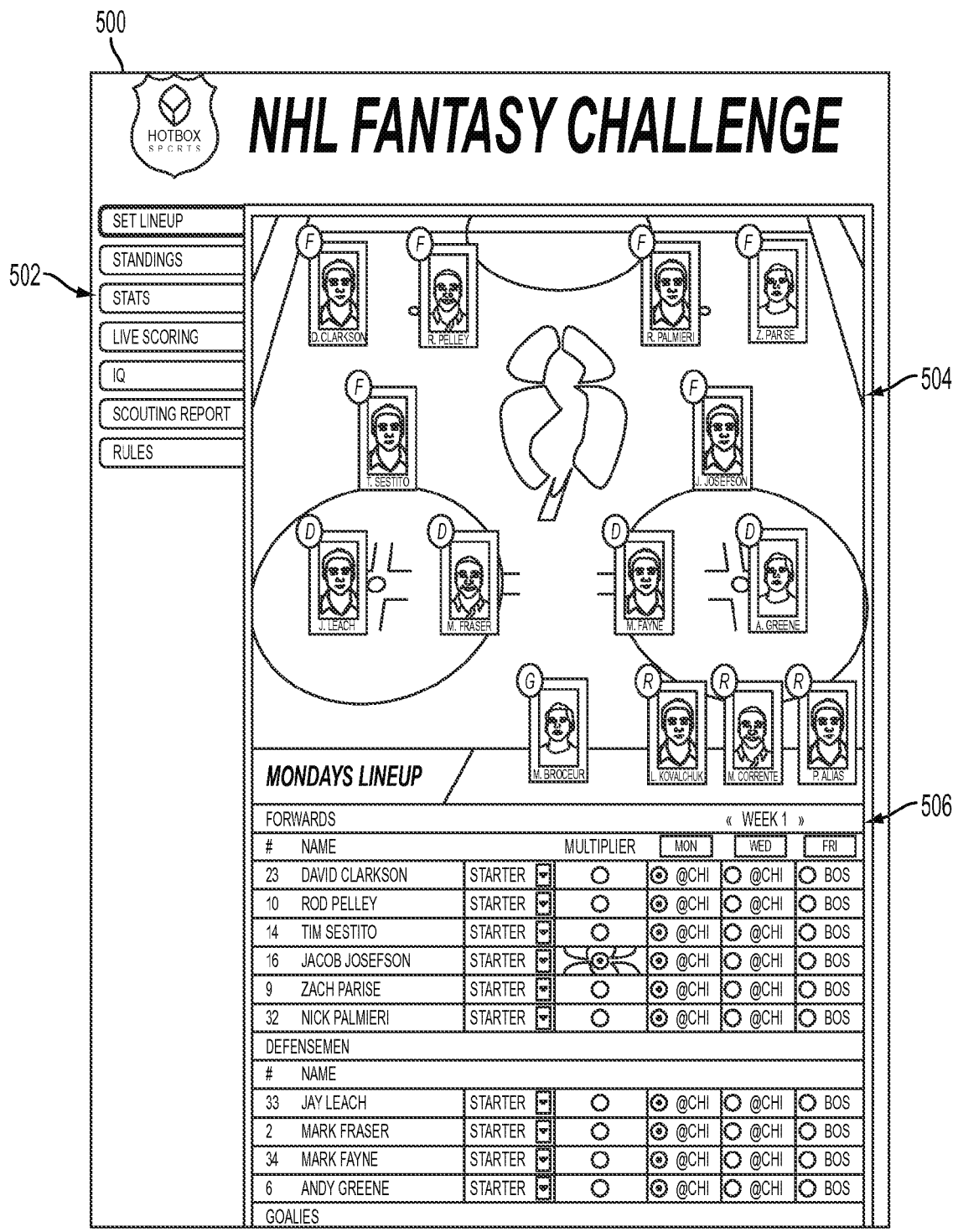
FIG. 5 illustrates an exemplary screenshot, in accordance with one embodiment of the present invention.

Now referring to FIG. 5, which is an exemplary screenshot 500 of one embodiment of the online fantasy sports game website. It should be appreciated that online fantasy sports game website is not limited to the features and overall look illustrated in FIG. 5. Also, the online fantasy sports game may be implemented as a mobile application. The screenshot 500 includes a menu 502, a graphical representation of players 504, and a fantasy sports game submission window 506. The fantasy sports game website is not limited to only these features. The menu 502 may include many different options including but not limited to set lineup, standings, statistics, live scoring, IQ scouring report, and rules.

The set lineup menu option may provide a user with the ability to either view a potential lineup planned for a particular real life sports game or allow the user to select which players will play in which position. The standings and statistics menu options may provide information to the user pertaining to the rankings of the players and teams. The live scoring menu option may provide the user with up to the moment scores or statistics of the games the user is interested. The live scoring menu option may further provide functionality to direct the user to a website to watch the game live. The IQ menu option may provide trivia or other valuable information about the players and teams. The scouting report menu option may provide the user with information about trades of players between teams or new players that may join the team in the future. The rules menu option may provide rule information about the particular sport or rule information about how the fantasy sports game is played and scored.

The graphical representation of players 504 may provide different functionalities. For example, after selecting the set lineup menu option in menu 502, the graphical representation of players may be displayed 504. The graphical representation of players 504 may illustrate to the user which players will be playing in a particular game and the positions for the players for that particular game. The graphical representation of players 504 may also illustrate which players will be sitting on the bench (or not playing) in that particular game. Also, the area that the graphical representation of players 504 may be a frame within the website that may change depending on a menu option selected (from menu 502). For example, if the user selects the live scoring menu option, the area of screenshot 500 that graphical representation of players 504 resides may change to provide the live scoring information. In the mobile application example, the user may be presented with a different screen entirely when the user selects from one of the options of menu 502.

The game submission window 506, which will be discussed in more detail below with respect to FIG. 6, provides the user the ability to select a game for each player. The user will select the game in which he or she believes that player will have his/her best game. The games are shown within a specific time window.

Now referring to FIG. 6, which is another exemplary screenshot of one embodiment of the online fantasy sports game website. As discussed above, the online fantasy sports game is not limited to only a website and may be implemented as a mobile application. Game submission window 600 includes the following: a listing of players by position 602, 604, starter designation 606, multiplier selection 608, games 610, 612, 614, season indicator 616, and day of the week indicator(s) 618. Game selection window 600 may include more or less options and is not limited to only these examples.

The listing of players by position 602, 604 illustrates one way of listing the players. In this example, the players are listed by position that they will be playing in the upcoming games. The screenshot is showing an NHL hockey team and therefore, the players are organized by forwards, defensemen, goalies, etc. It should be appreciated that when the sport, team, or players change, the positions and names change accordingly. The listing of players may also be organized by starting players, alphabetical, etc.

The starter designation 606 may provide a couple of different functionalities, such as letting a user decide whether the player should start in a fantasy game or the fantasy sports game system retrieves this information about the real life sports game. Selecting a player to start may not dependent on whether that actual player ends up starting in the selected game or that player ends up not playing because of an injury, etc. Starting a player by a fantasy player may essentially mean selecting a performance, if any, of that player at that game.

The multiplier selection 608 may provide the user the option to make this selection in the situation that the user is very confident that the selections he/she will make about the players are correct. For example, if the multiplier selection 608 is selected and the user wins, then the amount of the award may be increased by a factor (e.g. doubled, tripled, etc.). Also, there may be an option for a player to select a mega selection within the game selection window. The mega selection may provide the functionality that a fantasy player has to select which player on his or her fantasy team or lineup that will have the best performance compared to all of the other player on his or her fantasy team or lineup. If the mega selection is selected, then the fantasy player has to select the correct player otherwise, the fantasy player will not win that game.

The games 610, 612, 614 are listed for the upcoming time window. The number of games in a time window may vary based on the sport selected or the fantasy sport game system may also provide the user the ability to choose the time window. In this example, there are three hockey games coming up for a time window of five days (Monday-Friday). Also, for each game it is noted who the team is playing and if the game is home or away. For example, "@CHI" indicates that it is an away game against the Chicago Blackhawks. The "BOS" indicates that it is a home game against the Boston Bruins.

Season indicator 616 illustrates at what point in the season that the specific time window the game submission window 600 is currently displaying (e.g. WEEK 1). The season indicator 616 may also provide the user to view future or past weeks by clicking or selecting the arrows on the left and right of "WEEK 1." Although, the user may be able to view past weeks in the game submission window 600, the fantasy sports game system can prevent the user from making changes to selections and submitting selections for past time windows. Day of the week indicator(s) 618 may illustrate to the user the day of the week that each game within the time window will be played. Even though it is not shown, either game submission window 600 or screenshot 500 of FIG. 5 may include a submit button that a user may select after the selection(s) have been made.

Figure 7:
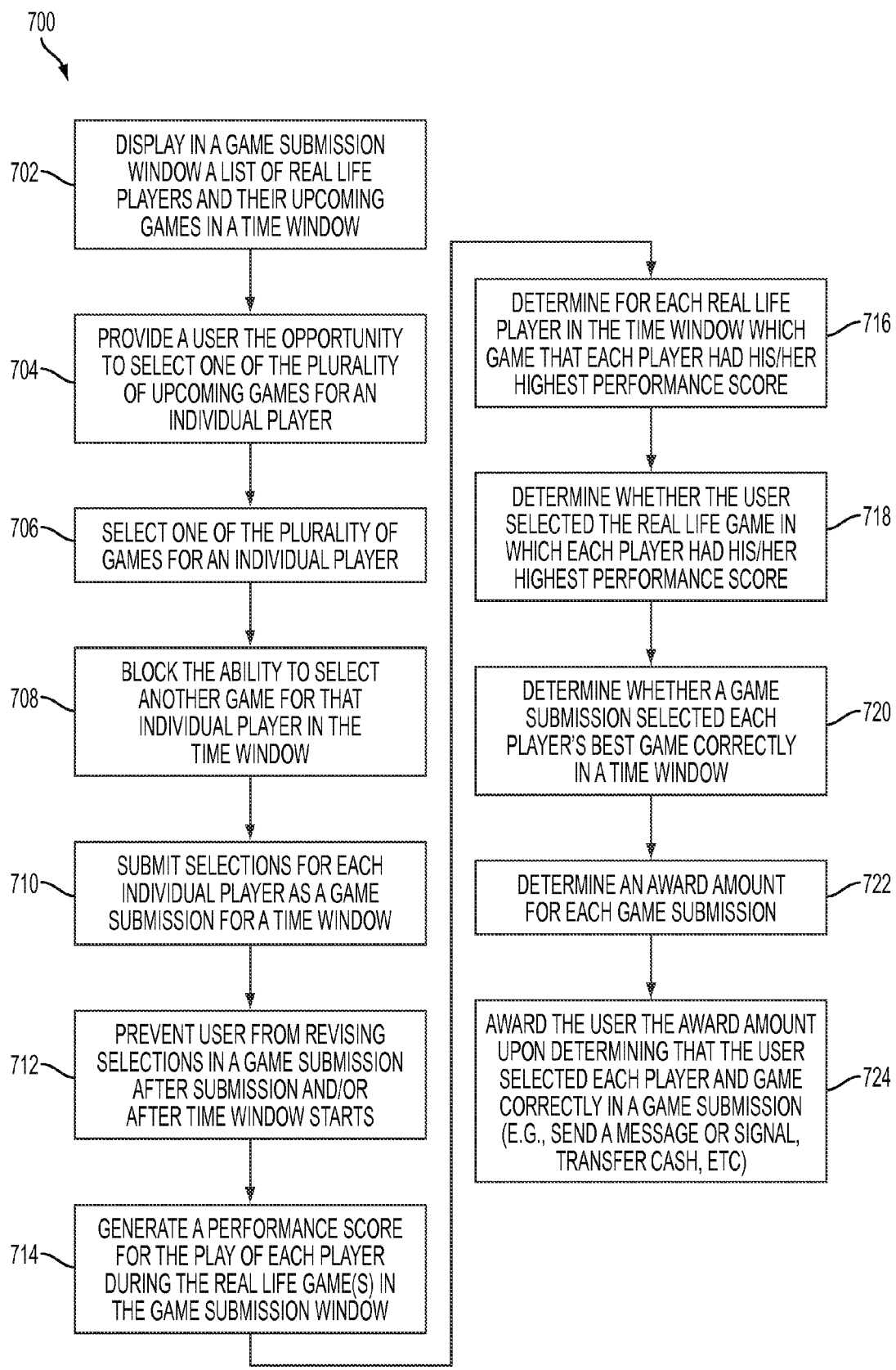
FIG. 7 illustrates another method and steps of one embodiment, in accordance with one embodiment of the present invention.

Now referring to FIG. 7, which is a flowchart of one embodiment of the online fantasy sports game process (700). At step 702, a list of real life players and their upcoming games within a specific time window are displayed in a game submission window. The list of players and their upcoming games will vary depending on the sport and/or league selected. At step 704, a user is provided the opportunity to select one of the plurality of upcoming games for an individual player. The user may also be able to make selections for multiple players. The user may also be able to select a fantasy lineup that includes at least two or more players.

At step 706, the user selects one of the plurality of games for an individual. At step 708, the user is blocked from being able to select another game for that individual player in the time window. The fantasy sports game system will also prevent the user from selecting all of the games within the time window. For example, if there are three games in a time window, then the user may be able to choose either one or two games but not all three. In other situations, the user may be able to only select one game in the time window.

At step 710, the user submits the selection(s) for each individual player as a lottery game submission for a time window. The user may submit several selections. At step 712, the fantasy sports game system may prevent the user from revising selections in a game submission after submission and/or after the time window starts. Once the user has submitted the game submission, the user should not be able to make changes to his/her selections. Also, once a time window has started, the fantasy sports game system will no longer accept game submissions for that time window.

At step 714, a fantasy performance score is generated based on how each player played during the real life sports game(s) in the game submission window. The fantasy performance score may be determined using a fantasy scoring formulation. The fantasy performance score may be scored based on many different factors, such as total points scored, assists, yards, blocks, etc. The fantasy performance score may be calculated differently for different sports and/or leagues.

Also, a fantasy performance score for a game may be calculated differently than for player. This is not an exhaustive list but it should be appreciated that the information to determine how well a player played in a specific game may be multifaceted.

At step 716, it is determined for each real life player in the time window which game that player had his/her highest fantasy performance score. Once the fantasy performance score has been calculated, then it is determined which game out of the time window was the best for each player. At step 718, it is determined whether the user selected the real life game in which each player had his/her highest performance score. So once it is determined which game was the best for each player in a time window, that is compared against the game submission from the user.

At step 720, it is determined whether a game submission selected each player's best game correctly in a time window. In one embodiment, a user can choose multiple selections about multiple players in one game submission, but each of the selections must be correct in order for the user to win an award. At step 722, an award amount is determined for each game submission. Each game submission may be treated differently. Some selections may have better odds than others. Therefore, the odds of winning based on the selections may also come into account to determine the amount of a possible award. At step 724, the user is awarded an award amount upon determining that the user selected each player and game correctly in a game submission (e.g., send a message or signal, transfer cash, etc.).

If desired, the fantasy sports game can be implemented as part of casino online gaming sites. If desired, the game can be configured to provide options other than a comparison-based selection, such as providing options to make selections against a sports line or performance threshold in a game. The options can be implemented using software and hardware as illustratively described here. If desired, the application and system may be used for enhancing performance measurement for training performances of athletes and sports teams. If desired, the fantasy game can be configured to allow a user to select a group of games for each real life player and use a comparison to an unselected group of games to determine whether the player own or selected correctly. If desired, the game can be configured to allow a user to select a team or a team's subteam (e.g., offense, defense, etc.).

The online fantasy sports game system, computing devices, databases, or other discrete software or hardware components can communicate and are arranged to carry out the illustrative processes and applications described herein by way of sending a signal such as a packet, digital message, or a command within a communication to or between components (and act in response to the receipt of a signal to carry our processes) and between or through supporting software or hardware such as communicating with an operating system, communicating with another resident application through an API or the like, communicating between network elements using an Internet protocol or one or more layers of the OSI model, or communicating through an intermediate component.

The online fantasy sports game system may operate in coordination with application software running external to the computing device to carry out or provide the intended game experience. For example, the online fantasy sports website or mobile application may interact with another software to authenticate a user, check the status of a user's account, or carry out financial transactions. Providing software features that are subsidiary or are tangential to the game functionality can be incorporated into the online fantasy sports game system or can be provided in conjunction or coordination with other software if desired.

A computing device can include a computer, computer system or other programmable electronic device, including a client computer, a server computer, a portable computer (including a laptop and a tablet), a handheld computer, a mobile phone (including a smart phone), a gaming device, an embedded controller and any combination and/or equivalent thereof (including touchless devices). Moreover, the computing device may be implemented using one or more networked computers, e.g., in a cluster or other distributed computing system. It is understood that the exemplary environment discussed and illustrated is not intended to limit the present disclosure, and that other alternative hardware and/or software environments may be used without departing from the scope of this disclosure. The present techniques can be applied to devices other than hand-held devices, such as laptops or desktop computers.

Further, the terms "computing device", "computer device", "computer" and "machine" are understood to be interchangeable terms and shall be taken to include any collection of computing devices that individually or jointly execute a set (or multiple sets) of instructions to perform any one or more of the methods discussed herein.

The local storage can include volatile memory (such as RAM) and/or non-volatile memory (such as ROM as well as any supplemental levels of memory, including but not limited to cache memories, programmable or flash memories and read-only memories). The computing device or hand-held device can include one or more processing devices (e.g., one or more central processing units (CPUs), one or more graphics processing units (GPUs), one or more microprocessors ($\mu$P) and similar and complementary devices) and optional media devices (e.g., a hard disk module, an optical disk module, etc.). Additionally, any storage techniques used in connection with the presently disclosed method and/or system may invariably be a combination of hardware and software.

One or more features illustratively described herein can be implemented individually or in various combinations. The present system, method, or related inventions also relate to a non-transient computer readable medium. The application can be set of instructions readable by a processor and stored on the non-transient computer readable medium. Such medium may be permanent or semi-permanent memory, such as hard drive, floppy drive, optical disk, flash memory, ROM, EPROM, EEPROM, etc., as would be known to those of ordinary skill in the art.

Features or characteristics described in one context, process, or device are applicable to other context, process or devices described herein. The steps of the processes illustratively described herein can be performed in a different order, if desired. Also, steps could be added or removed from the processes illustratively described herein. The processes or steps illustratively described herein can be implemented in software and data (in computer readable medium, transient and/or nontransient) using the described examples of hardware and network configurations.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the claims to the invention.

What is claimed is:

1. A computer-implemented method enabling a user to play an online fantasy sports game, the method comprising:
   providing, to the user, an opportunity to play the online fantasy sports game when the user lands on a lottery site;
   in response to a user selection to play a fantasy sports game on the lottery site, directing the user to the online fantasy sports game;
   in response to the selection, providing, to the user, a plurality of fantasy sports selection options for playing the game, the plurality of fantasy sports selections options corresponds to the option to select from a plurality of related actual sports games specified in a time window, where the time window is less than a full season;
   receiving, from the user, a set of fantasy sports selections, wherein each selection in the set of fantasy selections comprises an identity of a real life player and a predicted actual sport game in the time window where the corresponding real life player will have the highest fantasy performance score, that completes a lottery submission before the time window begins;
   determining, on a computer system and from a data feed of game activity, a fantasy performance score for each of the plurality of corresponding actual sports games using a fantasy scoring formulation;
   determining on the computer system for a plurality of real life players a best game in the time window by identifying the real life game in which the plurality of players had their highest fantasy performance score;
   determining, on the computer system, which users have won the online fantasy sports game based on the number of each user's selections which correctly predicted the actual sport game in the time window where the corresponding real life player had the highest fantasy performance score; and
   transmitting electronic message indicating one more winners of corresponding lottery submissions when certain users are identified by the computer system to have won the fantasy sports game.

2. The method of claim 1, wherein the fantasy sports selections relate to a real life player.

3. The method of claim 2, further comprising determining a player fantasy performance score for a real life player.

4. The method of claim 3, wherein the user submits at least five fantasy sports selections.

5. The method of claim 4, further comprising:
   determining real life players best game based on the player fantasy performance score in the time window involving five games;
   comparing the user's at least five selections and the determined real life players best game; and
   determining that the user's at least five selections and each corresponding one of the real life players best game are the same.

6. The method of claim 5, further comprises that the user is a winner of the online fantasy sports game when each of the user's five selections are the same as each of the player's best game.

7. The method of claim 1, wherein the one or more related actual sports games are either professional sports teams or college sports teams.

8. The method of claim 1 further comprises providing a multiplier selection that when selected and the user is a winner, awarding the user with a more valuable award.

9. The method of claim 1, wherein the online fantasy sports game is a mobile application.

10. The method of claim 1, wherein the lottery site is a mobile application.

11. A method enabling a user to play an online fantasy sports game, the method comprising:
    displaying in a game submission window a set of real life players and a plurality of corresponding real life games in a time window, wherein the time window is less than a full season and the time window includes at least two or more real life games;
    enabling a user to make a selection of a fantasy lineup, the fantasy lineup including a subset of the set of real life players, wherein in the subset includes at least two or more real life players;
    enabling the user to make a game selection of one of the plurality of corresponding real life games for each of the real life players in the fantasy lineup, wherein the user is allowed to make a single game selection for each real life player;
    receiving, by a computer system, the game selections from the user for the fantasy lineup and recording the selections in a database associated with the computer system;
    submitting each game selection as a game submission for the user for the time window;
    preventing the user from revising any game selections after the time window has started;
    generating on the computer system using data feeds of game activity a fantasy performance score for each real life player corresponding to the plurality of corresponding real life games in the time window using a fantasy scoring formulation;
    determining on the computer system for each real life player a best game in the time window by identifying the real life game in which that player had his highest fantasy performance score;
    determining, on the computer system, that the user selected each player's best game correctly in the time window;
    determining, on the computer system, an award amount for each game submission and time window; and
    transmitting an electronic message awarding the user the award amount upon determining that the selected each real life player correctly in the game submission.

12. The method of claim 11, wherein the plurality of corresponding real life games are professional sports teams or college sports teams.

13. The method of claim 11, wherein the fantasy lineup includes at least five real life players and game submission includes at least five game selections corresponding to the at least five real life players.

14. The method of claim 13 further comprises determining that the user's at least five selections and the game corresponding to the player's best game are the same.

15. The method of claim 11 further comprises providing a multiplier selection that when selected and the user is a winner, increasing the award amount.

16. The method of claim 11, wherein the online fantasy sports game is a mobile application.

17. A non-transitory computer-readable media comprising a plurality of instructions that, when executed, cause an electronic device to:
    provide, to a user, an opportunity to play the online fantasy sports game when the user lands on a lottery site;
    in response to a user selection to play a fantasy sports game on the lottery site, direct the user to the online fantasy sports game;
    in response to the selection, provide, to the user, a plurality of fantasy sports selection options for playing the game, the plurality of fantasy sports selections options corresponds to the option to select from a plurality of related actual sports games specified in a time window, where the time window is less than a full season;

receive, from the user, a set of fantasy sports selections that completes a lottery submission before the time window begins, wherein each selection in the set of fantasy selections comprises an identity of a real life player and a predicted actual sport game in the time window where the corresponding real life player will have the highest fantasy performance score;

determine, on a computer system and from a data feed of game activity, a fantasy performance score for each of the plurality of corresponding actual sports games using a fantasy scoring formulation;

determine on a computer system for a plurality of real life players a best game in the time window by identifying the real life game in which the plurality of players had their highest fantasy performance score;

determine, on a computer system, which users have won the online fantasy sports game based on the number of each user's selections which correctly predicted the actual sport game in the time window where the corresponding real life player had the highest fantasy performance score; and transmit electronic message indicating one more winners of corresponding lottery submissions when certain users are identified by the computer system to have won the fantasy sports game.

18. A non-transitory computer-readable media comprising a plurality of instructions that, when executed, cause an electronic device to:

display in a game submission window a set of real life players and a plurality of corresponding real life games in a time window, wherein the time window is less than a full season and the time window includes at least two or more real life games;

enable a user to make a selection of a fantasy lineup, the fantasy lineup including a subset of the set of real life players, wherein in the subset includes at least two or more real life players;

enable the user to make a game selection of one of the plurality of corresponding real life games for each of the real life players in the fantasy lineup, wherein the user is allowed to make a single game selection for each real life player;

receive, by a computer system, the game selections from the user for the fantasy lineup and recording the selections in a database associated with the computer system;

submit each game selection as a game submission for the user for the time window;

prevent the user from revising any game selections after the time window has started;

generate on the computer system using data feeds of game activity a fantasy performance score for each real life player corresponding to the plurality of corresponding real life games in the time window using a fantasy scoring formulation;

determine on the computer system for each real life player a best game in the time window by identifying the real life game in which that player had his highest fantasy performance score;

determine, on the computer system, that the user selected each player's best game correctly in the time window;

determine, on the computer system, an award amount for each game submission and time window; and transmit an electronic message awarding the user the award amount upon determining that the selected each real life player correctly in the game submission.

\* \* \* \* \*